United States Patent [19]

Lippa

[11] 4,296,908

[45] Oct. 27, 1981

[54] MOLD FOR INTEGRAL BASE FOR CASTING CERAMIC MATERIAL IN THE FORM OF A SLIP

[75] Inventor: Giuseppe Lippa, Brescia, Italy

[73] Assignee: American Standard Inc., New York, N.Y.

[21] Appl. No.: 172,792

[22] Filed: Jul. 28, 1980

[30] Foreign Application Priority Data

Aug. 8, 1979 [IT] Italy ............................ 46864 A/79

[51] Int. Cl.[3] ......................... B29C 1/14; B28C 7/06; B28C 7/34; B28C 7/16

[52] U.S. Cl. ...................................... 249/58; 249/122; 249/125; 249/127; 249/142; 249/160; 249/175; 425/438; 425/439

[58] Field of Search .................. 249/58, 63, 117, 137, 249/142, 144, 150, 160, 163, 173, 175, 177, 183, 184, 122, 125, 127; 425/88, 435, 439, 444, DIG. 44

[56] References Cited

U.S. PATENT DOCUMENTS

| | | | |
|---|---|---|---|
| 1,183,067 | 5/1916 | Hill | 249/144 |
| 1,447,529 | 3/1923 | Bowers | 249/58 |
| 2,449,249 | 9/1948 | Pieslak et al. | 249/58 |
| 2,565,356 | 8/1951 | Crane et al. | 249/144 |
| 3,278,151 | 10/1966 | Schindler et al. | 249/58 |
| 3,461,194 | 8/1969 | Alexander | 249/58 |

*Primary Examiner*—W. E. Hoag

*Attorney, Agent, or Firm*—James J. Salerno, Jr.; Robert G. Crooks; John P. Sinnott

[57] ABSTRACT

A mold having an integral piece for casting a hygienic-sanitary appliance is disclosed. The mold includes a lower mold piece, at least two lateral mold pieces which are mounted on the lower mold piece to define a molding cavity for an article to be cast. An upper mold piece is mounted in position on the lateral mold pieces to close the mold cavity; the lateral and upper mold pieces being separable from the lower mold piece and the cast article to leave the latter resting on the lower mold piece. Below the cavity of the mold there is provided an annular or partially annular shaped base to support the cast article.

15 Claims, 3 Drawing Figures

MOLD FOR INTEGRAL BASE FOR CASTING CERAMIC MATERIAL IN THE FORM OF A SLIP

BACKGROUND OF THE INVENTION

The present invention generally relates to a complex plaster mold for casting a ceramic material in slip form and more particularly, it relates to a complex mold within an integral base for casting hygienic-sanitary appliances generally.

It is notable that in casting the latter, and for example in casting bidets and lavatory bowls, complex plaster molds have been used which define the external surfaces and internal cavities of the aforesaid appliances.

These complex molds are constituted by several elements, normally comprising a foot, suitable lateral mold pieces and an upper mold piece. Appliances are cast in these complex molds with the mouth of their bowl or pan facing upwards for reasons of practicality during the removal stages of such hygienic-sanitary appliances from the mold.

These removal stages, in fact, consist of firstly extracting the upper mold piece and replacing it by a base which later serves as the support for the hygienic-sanitary appliance during the subsequent production stages.

The mold is then overturned together with the base and then one proceeds with the extraction of the lower mold piece, which is now at the top, and the opening of the lateral mold pieces.

In this manner, the hygienic-sanitary appliance remains resting on the base and is conveyed to the subsequent working stations. However, this method requires the installation of complex casting systems which have to be provided with complicated devices for overturning the mold after the base has been placed on it. Also, the removal of the cast material from the mold requires an excessively long time, as already stated. Additionally, it requires a large number of personnel, which may exceed fifty or more, because a large number of appliances are cast simultaneously on the present-day casting benches.

From the aforegoing, it evidently appears impossible to obtain complete cast articles of the above-described type, i.e. provided with said hollow part.

SUMMARY OF THE INVENTION

The object of the present invention is to provide and protect a mold of the integral base type, which, although of simple, rational and extremely reliable construction, allows the casting of objects in the overturned position without the necessity of resorting to a separate base on which to place them during the removal state. More particularly, the invention is directed to sanitary articles having the upper rim, in hollow form constituted by a double thin wall.

According to the invention, the mold proposed is of the type which comprises a lower mold piece, at least two lateral mold pieces which are suitable for being gripped on the lower mold piece to define a molding cavity for an article which is to be cast in the mold, an upper mold piece suitable for closing the molding cavity, said lateral and upper mold pieces being separable from the lower mold piece and the cast article to leave the latter resting on the lower mold piece, and it is characterized by the fact that it provides, below the cavity for molding the article, an annular or partially annular base shaped so as to be able to support the article through that part of the latter which is lower relative to its casting position.

Ribbing which is a form of plaster may be integral with the lateral mold pieces, removably fixed to the lower mold piece and removably fixed to the lateral mold pieces, defines the base of the casting cavity. The ribbing is preferably made of the same material as that constituting the mold, such as plaster.

The above-described base can be of any suitable material like, for example, plaster or a synthetic material.

The objects and advantages of the invention, together with its characteristics and merits, will be more apparent from the detailed description given hereinafter with reference to the accompanying drawings which illustrate one particular embodiment thereof, relative to the formation of bidets, by way of non-limitative example.

DETAILED DESCRIPTION OF THE PREFERRED EMBODIMENT

Figure 1:
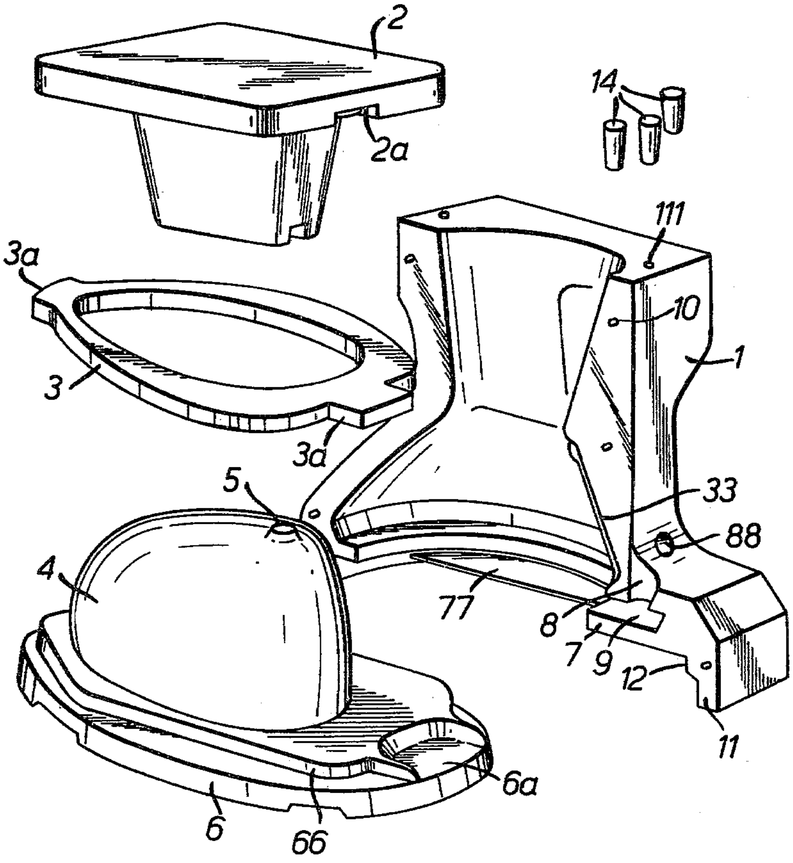
FIG. 1 is an exploded perspective view illustrating the elements which make up the device of the present invention, with the exception of one lateral mold piece.

From the figures, and in particularly FIG. 1, it can be seen that the complex mold herein comprises a lower mold piece 4, designed to form the bowl cavity of a bidet 13, two lateral symmetrical mold pieces 1, designed to define the surfaces of bidet 13 and of which the left hand mold piece has not been shown for simplicity, and an upper mold piece 2 designed to form the cavity of the foot of bidet 13.

FIG. 1 also shows a plate-like base 3 of annular shape which is designed to be removably mounted on the lower mold piece 4 when assembling the mold. In addition base 3 can also be partially annular, or any other suitable shape, to suit the article to be cast in the corresponding mold.

Also, base 3 may be constructed of any suitable material, for example plaster or a synthetic material. Preferably, the base 3 is constituted by a semi-rigid expanded polyurethane.

All the mold pieces constituting the mold are constructed of plaster in order to absorb the moisture of the ceramic material, in the form of slip, which is cast in the mold. The base 3 is provided with two opposing external grips 3*a*, aligned with the longitudinal axis of symmetry of the corresponding base 3.

The lower mold piece 4 is provided with a pedestal 6 designed to support the base 3 and upperly comprising two depressions 6*a* aligned with the longitudinal axis of symmetry of pedestal 6.

Figure 3:
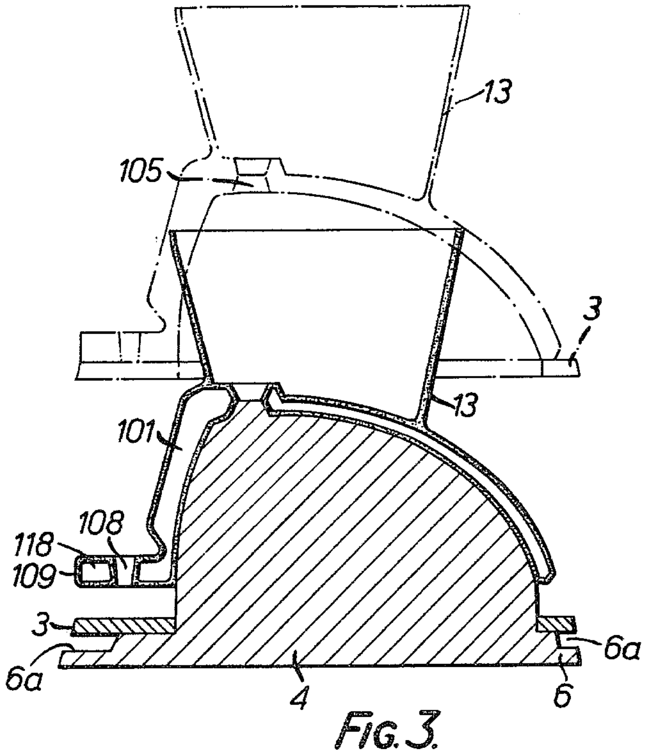
FIG. 3 is a view similar to FIG. 2 and illustrates the removal of the mold elements during the extraction of the bidet from its lower mold piece, with the bidet resting on the base.

On the upper part of the lower mold piece 4, there is provided a frusto-conical projection 5 designed to form the discharge hole 105, see FIG. 3, for the bidet 13. Consequently, relative to this latter, the frusto-conical projection 5 is located to the rear of the summit of the lower mold piece 4.

The internal aperture of the annular base 3 substantially coincides with the cross-section of the lower mold piece 4 at that point at which it joins to the pedestal 6. The upper mold piece 2 comprises two opposing depressions 2a which are made in the face of that support rim which makes contact with the upper faces of the lateral mold pieces 1.

From this face of the support rim, there projects a series of centering pins, not shown, which, when the mold is assembled, penetrate into suitable seats 111 in the upper faces of the lateral mold pieces 1.

In the same manner, on the vertical separation surface of the right hand lateral mold piece 1 there is a series of centering pins 10 which, when the mold is assembled, penetrate into suitable seats in the corresponding vertical separation surface of the left hand lateral mold piece, this latter not being shown.

From the bottom of the internal surface of each lateral mold piece 1 there projects a shelf 7, the inner vertical rim of which, when viewed in plan, has substantially the same shape as one longitudinal half of the central aperture in the base 3. In addition, the upper faces of the shelves 7 are inclined slightly towards the bottom and the inside of the mold so as to avoid harmful rubbing against the mouth of the bowl of the bidet 13 during the opening of the lateral mold pieces 1.

In the rear zone, obviously relative to the bidet 13 to be cast, of each lateral mold piece 1 there is provided a recess 9, the lower surface of which is coplanar with the upper face of the shelf 7.

As clearly shown in FIG. 1 this recess 9 opens, both into the inner surface and into the vertical separation surface of the corresponding lateral mold piece 1.

Immediately above recess 9, each lateral mold piece is provided with an elongated cavity 33 which, similarly to the corresponding recess 9 leads into the inner surface and into the vertical separation surface of the lateral mold piece.

In the wall of the lateral mold piece 1 which upperly limits the recess 9 there is provided a frusto-conical aperture 88 designed to receive a plaster plug 14. In the same wall, but at the vertical separation surface of the lateral mold piece 1, there is provided a frusto-conical channel 8. Also on the other lateral mold piece there are the aforesaid frusto-conical channel and aperture, respectively 8 and 88.

Preferably the longitudinal axes of the frusto-conical aperture 88 and frusto-conical channel 8 are disposed orthogonally to the perimetrical shelf 7. The two longitudinal axes lie on a plane orthogonal to the vertical separation surface of the corresponding lateral mold piece 1.

Below the shelf 7 each lateral mold piece 1 of the mold is provided with a widened shoulder 12, the shape of which practically coincides with the external configuration of the base 3.

Finally, to the side of and below widened shoulder 12 there is provided a perimetrical rim 11 which, internally, is of the same shape as the pedestal 6 of the lower mold piece 4.

A flange 77 projects from the central region of this perimetrical rim 11 and its dimensions correspond to those of a pair of depressions 66 which are symmetrically disposed along the longitudinal axis of the pedestal 6, the upper face of which carries these depressions 66. Furthermore, the distance between the lower face of the perimetrical rim 11 and the lower face of the shelf 7 is practically equal to the overall thickness of the pedestal 6 and base 3.

The complex mold heretofore described is used in the following manner.

The lower mold piece of the mold 4 is fixed to a carriage lying on the rails of a normal installation for the simultaneous casting of a plurality of hygienic-sanitary appliances.

With reference to the exploded view of FIG. 1, the mold according to the invention is assembled by firstly mounting the base 3 onto the lower mold piece 4 until base 3 rests on the pedestal 6. In this manner the grips 3a in base 3 lie exactly above the corresponding depressions 6a in the pedestal 6.

Figure 2:
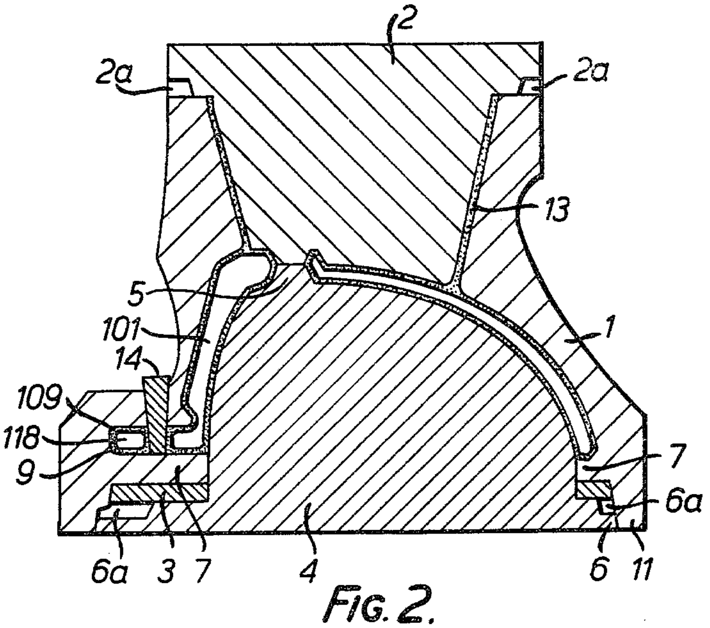
FIG. 2 is a sectional view of the assembled mold, taken on the separation surface between the two lateral mold pieces, together with a bidet cast in the mold cavity.

The lateral mold pieces 1 are then brought together so that they enclose the lower mold piece 4. As shown in FIG. 2, by means of this operation the perimetrical rims 11 completely surround the pedestal 6, the flanges 77 are inserted below the base 3 and into the depressions 66, and the shelves 7 are disposed on the base 3. At the same time the two cavities 33 come together and the two recesses 9 become aligned. In addition the two channels 8 form a single frusto-conical aperture similar to the apertures 88.

The upper mold piece 2 is then positioned on the lateral mold pieces 1 and in practice comes into contact with the upper part of the projection 5.

When the mold pieces assembled in this manner have been securely clamped to prevent any reciprocal movement during casting, the paster plugs 14 are inserted into the apertures 8 and 88 so that in practice their lower ends come into contact with the lower surface of the complete recess 9.

At this point, the mold is ready for casting, which is carried out through a suitable passage, not shown, which is provided in the upper mold piece 2.

It should be noted, that the aforesaid casting phase is carried out on a normal casting installation, the rails of which carry a plurality of molds which may comprise more than fifty units.

It should be further noted that with a mold equipped in this manner, a special casting installation is not necessary, and instead any installation for the vertical casting of hygienic-sanitary appliances other than bidets, can be used, for example, an installation for the vertical casting of wash basins and their corresponding pillars.

The liquid ceramic material, in slip form, is introduced into the mold and runs into the casting cavity defined by the mold pieces which make up the mold, until filling is complete.

The mold is then left for a sufficient time to enable its constituent plaster to absorb the moisture of the previously cast liquid ceramic material in slip form.

As shown in FIG. 2, a bidet 13 is produced in this manner in the mold and is in an inverted position, that is, arranged for its extraction from the mold and conveying to the subsequent operational stages.

During this rest period a hollow region 101 bounded by two thin walls is formed in the rear part of the bidet 13 where the mold cavities 33 are provided, this hollow region being designed to join the overflow hole to the discharge hole 105 where the appliance is finished.

The present invention also enables a hollow region 118 to be formed at the top of the bidet 13, and more particularly, at its rear end where the projection 109 is formed in the complete recess 9. This is due to the advantageous presence of the shelf 7 which, being constructed of plaster, absorbs the moisture present in the slip which occupies the complete recess 9.

Thus a complete bidet is obtained after casting, which is inverted and ready for being lifted on the base 3, thereby enabling the subsequent finishing operations to be greatly facilitated.

A further extremely advantageous point is due to the presence of the plaster plugs 14 which enable through-holes 108 to be formed in the thin walls of the projection 109 which bound the hollow region 118, for fitting the taps, valves to the bidet 13. When the bidet 13 has sufficiently hardened, including the lower thin wall of the hollow region 118 formed by the presence of the underlying shelf 7, the appliance is removed from the mold.

The first removal stages comprise the widrawing of the plugs 14 and upper mold piece 2. The two lateral mold pieces 1 are then withdrawn from each other by a horizontal movement parallel to the rails of the casting installation and these mold pieces do not damage the mouth of the bowl of the bidet cast as described above, the shelves 7 advantageously having on top a slight inclination towards the bottom and the inside of the mold.

In this manner the base 3 remains resting on the pedestal 6 while the bidet 13 is supported by the top of the lower mold piece 4. The base 3 is then withdrawn from the lower mold piece 4. The operator is able to grip the grips 3*a* on the base 3 because of the advantageous presence of the depressions 6*a* in the pedestal 6. After passing through a short distance, the base 3 comes into contact with the bowl mouth of the bidet 13 which is thus withdrawn from the lower mold piece 4 as it is supported by the base 3.

The bidet is then conveyed to the subsequent finishing stages. The mold is again assembled using a new base 3, as that used before acts as a support for the cast article which is drying, and the successive casting and mold stripping stages again take place in the previously described manner. It is apparent that although particular reference has been made to the use of a mold thus equipped for casting complete bidets, the teaching derived from its special constructional characteristics can also be utilized for casting hygienic-sanitary appliances other than bidets, as indeed for any mold intended for casting a ceramic material in slip form.

The invention is not limited to the single embodiment heretofore described, and modifications and improvements can be made thereto without departing from the invention.

What is claimed:

1. A mold for casting ceramic material in slip form, which comprises a lower mold part resting on a support; at least two further mold parts adapted to be assembled with said lower mold part to define, in combination therewith, a cavity for casting and molding the article to be cast in the mold, said further mold parts including a removable ring and shelf portions on lateral mold members adapted to be positioned on said lower mold part to define the base of said cavity; said further mold parts being removable from said lower mold part after completion of the cast article so that the latter remains positioned on said lower part of the mold; said lower part bearing said ring to support said cast article on its lower rim in relation to its casting position, said ring being removably positioned on the inside of said lower part of the mold, and being supported by the lower part of the mold below said shelf portions so that, after casting, when the further mold parts have been removed from the lower mold part and the molded article, said ring may be lifted to contact said molded article so as to lift it out from the lower mold part.

2. The mold according to claim 1 wherein said shelf portions are monolithic with the further mold parts.

3. The mold according to claim 1, wherein said shelf is formed having a slight taper or inclination endwards to avoid scraping against the molded article when said further mold parts are withdrawn.

4. The mold according to claim 1, wherein said shelf is made of plaster.

5. The mold according to claim 1, wherein said at least the partially annular seat is made of a plastics material.

6. The mold according to claim 5, wherein said plastics material is semi-rigid expanded polyurethane.

7. The mold according to claim 1, wherein said shelf has its inner free rim mate with the lower part of the lower mold piece.

8. The mold according to claim 7, wherein said base has a central aperture which mates with the lower end of the lower mold piece and comprises two opposing grips which are disposed on the longitudinal axis of symmetry of the base.

9. The mold according to claim 7, said lower mold piece includes a pedestal for supporting said base, and said pedestal there having two depressions which lie underneath the grips of said base when the mold is assembled.

10. The mold according to claim 7, wherein below said perimetrical shelves projecting from said lateral mold pieces are provided two widened shoulders, one for each lateral mold piece which mate with the outer configuration of the base.

11. The mold according to claim 16, wherein below the corresponding widened shoulder each lateral mold piece is provided with a perimetrical rim which is shaped, internally, like the outer perimetrical configuration of the pedestal on which the lower mold piece is disposed.

12. A mold having an integral base and being adapted for casting a complete bidet which comprises a lower mold piece, two lateral mold pieces, an upper mold piece and a base, each of said lateral mold pieces have a shelf which projects from the inner lower region of each lateral mold piece and is constructed to lowerly delimit the casting cavity of the assembled mold, above the rear region of which, relative to the appliance to be cast, each lateral mold piece is formed having a recess forming passage which communicates upperly with the outside of said mold and closure means disposed in said recess, there being a base in the form of a removable ring and made of impermeable resistant material which is disposed between said perimetral shelf and the pedestal of the lower mold piece.

13. The mold according to claim 12, wherein said recess of each lateral mold piece opens onto the inner surface of this lateral mold piece and onto the vertical surface separating this latter lateral mold piece from the other lateral mold piece; the lower surface of said recess being coplanar with the upper surface of the corresponding perimetral shelf.

14. The mold according to claim 12, wherein said passage formed in each of said lateral mold pieces is defined as a frusto-conical aperture which is disposed to the side of the vertical separation surface of the corresponding lateral mold piece and by a frusto-conical channel provided in the vertical separation surface of the same lateral mold piece, the corresponding channel of which, is on the vertical separation surface of the other lateral mold piece, the longitudinal axes of these passages being orthogonal to the underlying perimetrical shelf.

15. The mold according to claim 12, wherein said closure means for each passage in said lateral mold pieces are in the form of three frusto-conical plaster plugs, each plug having a length such as to penetrate into the corresponding recesses a distance to contact the lower surface of said recess.

* * * * *